United States Patent [19]

Nii et al.

[11] Patent Number: 5,079,575
[45] Date of Patent: Jan. 7, 1992

[54] CAMERA INCORPORATING A ZOOM LENS

[75] Inventors: Tamotsu Nii; Nobuyoshi Mori; Hideo Shizume, all of Hachioji, Japan

[73] Assignee: Konica Corporation, Tokyo, Japan

[21] Appl. No.: 484,840

[22] Filed: Feb. 26, 1990

[30] Foreign Application Priority Data

Mar. 1, 1989 [JP] Japan .................... 1-49256

[51] Int. Cl.$^5$ .................... G03B 5/00; G03B 7/00; G03B 9/08; G03B 15/14
[52] U.S. Cl. .................... 354/195.11; 354/270; 359/694; 359/740
[58] Field of Search .......... 354/195.1, 195.11, 195.12, 354/400; 350/423, 429, 450, 449, 270, 274

[56] References Cited

U.S. PATENT DOCUMENTS

| | | | |
|---|---|---|---|
| 4,043,642 | 8/1977 | Hirose et al. | 354/195.11 |
| 4,141,636 | 2/1979 | Shimojima | 354/195.1 |
| 4,865,433 | 9/1989 | Okajima et al. | 354/195.11 |
| 4,980,711 | 12/1990 | Komatsuzaki et al. | 354/195.1 |

Primary Examiner—W. B. Perkey
Attorney, Agent, or Firm—Finnegan, Henderson, Farabow, Garrett, and Dunner

[57] ABSTRACT

When a lens system is focussed at a fixed length, what range of an object is clearly photographed is determined by the focal length and F number of the lens. In order that a zoom lens which requires no focussing operation is mounted on the beginners' camera to make the focussing range as wide as possible, the focussing position need be deviated as the focal length f varies as zooming takes place. If F number is selected in the range of $F \geq 2.8 \times 10^{-3} \times f^2$, a performance camera can be realized with a zoom lens including a wide angle and having a variable power ratio of the order of 2.

8 Claims, 6 Drawing Sheets

CAMERA INCORPORATING A ZOOM LENS

BACKGROUND OF THE INVENTION

1. Field of the Invention

This invention relates to a camera incorporating a zoom lens therein, and more particularly to a zoom lens suitable for a compact camera.

2. Description of the Prior Art

Compact cameras have many desirable features, for example they are small in size, are easily used and are inexpensive. With recent popularization of such compact cameras, compact cameras capable of higher functions and multi-functions are in demand. For example, cameras equipped with an AF (automatic focal adjustment) mechanism or a zoom mechanism have begun to appear in the market. Among them, are compact cameras having a zoom function capable of continuously varying the photographic magnification, in the hope in that a new market be found.

Most users of compact cameras are beginners and intermediate photographers. The cameras are often used for memorial photographs at family trips or group's trips. In these types of pictures, long distance photography is often used, and in case of utilizing a strobe, photography at close quarters or at a short distance is effected. Accordingly, it is desirable for the camera to be provided with the following two functions:

(1) Universality of photographic functions in a wide range from a short distance to a long distance, and
(2) Readiness of operation.

It is thus contemplated that for (1) for the universality of photographic function, "a zoom lens system capable of continuously varying a focal length" within a predetermined range is used and (2) for the readiness of operation, "a pan focus system not requiring a focussing operation" is used. Specifically, a zoom lens is constituted so that a focal position of a zoom lens system comprising a plurality of lens groups is set in panfocus, so as to have a depth of field from a predetermined short distance to a long distance or an infinitedly long distance ($\infty$).

However, when a zoom lens having both the panfocus function and zoom function is applied to a compact lens, both the functions are related to one another, and under this specific condition, their respective merits are possibly offset. Moreover, mounting of such a zoom lens on a compact lens should not affect the properties of small-size and light-weight which form features inherent in the compact lens.

SUMMARY OF THE INVENTION

In view of the foregoing, it is an object of the present invention to provide a camera incorporating a zoom lens which has both merits of the panfocus function and zoom lens function and is excellent in practicality.

For achieving the aforesaid object, in the zoom lens according to the present invention, a focal position is fixed, but it is set so that a focal position is displaced or a F-number is varied in order that a farthest limit of a depth of field is always infinitely far during zooming.

In order to realize the panfocus as described, the focal length f and F number or relative aperature of the zoom lens have to be fulfilled with the following relationship $$F \gtreqless 2.8 \times 10^{-3} \times f^2$$

for the entire area of zooming.

In order to obtain the advantageous photographic condition, the diaphragm aperture is varied as zooming takes place. The following relationship is maintained irrespective of the focal length.

$$F \approx 2.8 \times 10^{-3} \times f^2$$

The variation of the focal position set as described above is carried out by imparting an amount of movement to the lens group to which is added an amount of movement for displacement of the focal position to one of the lens groups to be displaced for zooming.

In this case, it is convenient, for imparting to the lens group an amount of movement which is equal to an amount of movement for displacing the focal position added to an amount of movement for the zooming. To do this, the present invention can rely on a single cam groove which realizes the synthesized amount of movement.

DETAILED DESCRIPTION OF THE INVENTION

Prior to entry into description of embodiments, an optical structure of a zoom lens according to the present invention will be clarified. First, optical parameters are listed below.

(1) Nearest limit of a depth of field: $U_n$
(2) Farthest limit of a depth of field: $U_f$
(3) Reference focal position: $U_o$
(4) Focal length: f
(5) F number
(6) Allowable diameter of circle of confusion: $\delta$
(7) Shutter speed: T
(8) EV (quantity of light) value
(9) Film latitude The conditions under which the aforementioned two functions are offset and the specification of design for the zoom lens system are determined by setting or selecting the values of these parameters. Therefore, the individual properties and mutual relationship of these parameters will be first examined in detail to clarify values to be fulfilled as or desirable for the panfocus type zoom lens for the compact camera.

For a panfocus type lens which does not requires a focussing operation, which forms one function of the present invention, it is necessary for both an object at near distance and an object at an infinitely far distance to be in focus. That is, an area for normal photograph should cover between the near point $U_n$ of the depth of field and the far point $U_f$ both in a focussed state and fixed to a predetermined focal position $U_o$ (hereinafter referred to as a reference focal position).

The range of the depth of field depends upon the type of cameras to which the zoom lens of the present invention is applied. The object of present invention is mainly to find the optimum range of the compact cameras used by beginner intermediate photographers, as previously mentioned.

Referring to the panfocus type cameras now available in the market, the near point $U_n$ and the far point $U_f$ are determined as given in Table 1 below.

TABLE 1

| Comparison of Depth of Field of Panfocus System | | | |
|---|---|---|---|
| Types of Camera | Range of Depth of Field | Focal Length | F number |
| A Co.-P | 1.3 m-∞ | 35 mm | 3.8 |
| B Co.-S | 1.5 m-∞ | 35 mm | 4.5 |
| C Co.-J | 1.5 m-∞ (W) | 35 mm | 5.6 |
|  | 2.0 m-∞ (T) | 55 mm | 8.5 |
| D Co.-T | 1.5 mm-∞ | 35 mm | 4.0 |
| E Co.-F | 1.5 m-∞ | 35 mm | 4.5 |
| F Co.-Y | 1.0 m-∞ | 35 mm | 4.0 |
| G Co.-S | 1.3 m-∞ | 35 mm | 4.5 |
| H Co.-T | 1.5 m-∞ (W) | 27 mm | 7.0 |
|  | 1.5 m-∞ (T) | 43 mm | 11.0 |
| I Co.-D | 1.2 m-∞ | 36 mm | 8.0 |

As will be apparent from Table 1, it is desirable that for the first condition, the panfocus, (Condition 1) the depth of field be in the range wider than 2.0 m − ∞.

Then, a lens system which includes a zooming function as a further function, while realizing such a depth of field may be constituted. However, between the previously mentioned optical parameters (1) to (6) which control the depth of field, the following fundamental formulas are established:

$$U_n = f^2 \cdot U_o / (f^2 + F \cdot \delta \cdot U_o) \quad (1)$$

$$U_f = f^2 \cdot U_o / (f^2 - F \cdot \delta \cdot U_o) \quad (2)$$

Therefore, the allowable circle of confusion $\delta$, the focal length f, the F number and the reference focal position $U_o$ cannot be independently decided.

To determine the necessary conditions for realizing wider depth of field, the following three conditions are to be added:

(Condition 2)—The larger the allowable circle of confusion the better.
(Condition 3)—The shorter the focal length f the better.
(Condition 4)—The larger the F number the better.

Among them, the allowable circle of confusion $\delta$ is a parameter representative of the dimming limit according to the distance of the photograph taken and, bears the reciprocal condition of "smaller is desirable" for obtaining a clear image quality.

Generally, the limit whether or not a human being judges a "point" as a point is said to be 0.16 mm$\phi$ at 50 to 200 lux and at a clearly visible distance (25 cm). If this value is a diameter of a point image of a photograph printed on a so-called service size format, the following is obtained on the 35 mm film surface:

0.16 mm$\phi$ × 0.3 = 0.048 mm and $\delta = 0.048$ (0.3 is the ratio between the 35 mm film and the service size format). From such a background, in a single-lens reflex camera, such a value is considered to be a dimming limit, and it is common to set the allowable circle of confusion $\delta$ to $\delta = 0.03$ to $0.05$ mm$\phi$.

However, in the compact camera, it is rarely that the size larger than the service size format is printed, and therefore, such a limit can be somewhat loosely interpreted. Moreover, in a case where the human being judges whether an object of a photograph is dim, he tends to be relatively tolerant for a large image taken severe for a small image taken at a far (∞) distance. However, in the present invention, both the panfocus and zoom lens are employed, and therefore, the limit relative to the allowable circle of confusion can be somewhat relieved even by an arrangement wherein the focus point (reference focal position) is moved far at a teleposition while moved near at a wide position. The focus position adjusting means comprises a rotary cam mechanism which will be described later.

According to the regulations with regard to "Cameras and Parts thereof" by Export Inspection Reference and Inspection Subsidiary Regulations, Foundational Juridical Person—Association of Inspection of Cameras and Optical Instruments in Japan, lenses are classified into three kinds, i.e., (1) lenses composed of three or more lenses, (2) zoom lens and (3) others. The resolving powers in the vicinity of the center of the three types are:

27.3/mm (1)
24.6/mm (2)
19.1/mm (3) (Image plane size = 24 × 36)

As for the panfocus system, there is merely described "For a fixed focal point, a set distance of a lens is used." The resolving power within the depth of field is not particularly prescribed. However, in the panfocus type zoom lens as in the present invention, the resolving power within the range of photographing should be increased. It should be at least 19.1/mm, corresponding to the resolving power belonging to "(3) others" among the aforementioned lenses. The resolving limit by eyes of the human is 5 to 6% on contrast. Therefore, if F is equal to 10 (F = 10), $\delta$ with respect to the resolving power = 19.1/mm is given by:

$\delta = 0.065$ mm$\phi$ from the equation representative of the relationship between defocus amount d and MTF (Modulation Transfer Function)

$$MTF = \frac{2 \times J_1(\pi \times S \times d/F)}{\pi \times S \times d/F} \quad (3)$$

wherein $J_1$ is the primary Bessel function, and the relative formula between the allowable circle of confusion $\delta$ and the defocus amount d $$\delta = d/F \quad (4)$$

We found from these valuation references and experimental results by the inventors of this application, that in the structure of the zoom lens according to the present invention, the reasonable allowable circle of confusion $\delta$ is $\delta = 0.07$ mm$\phi$ Next, the value of the aforementioned parameter $U_o$ (reference focal position) will be clarified on the premise of visibility as described above.

The reference focal position $U_o$, the near point $U_n$ of the depth of field and the far point $U_f$ are related by the following formula upon elimination of $\delta \cdot F/f^2$ from the formulas (1) and (2)

$$U_o = 2 \cdot U_n \cdot U_f / (U_n + U_f) \qquad (5)$$

In the case of the panfocus type, lens the far point $U_f$ is ∞ but the actual limit (light angle: 30″) in which the human eyes can judge the distance of the object is 450 m, and therefore, $U_f = 450$ m may be used. The infinite far point in this specification refers to actual limit. For example, if $U_n$ is equal to 1.5 m ($U_n = 1.5$ m), the following value is derived from the formula (5):

$$U_o = 2.99 \text{ m}$$

The relationship, as given in Table 2, showing the correspondence between the value of $U_o$ according to $U_n$ can be obtained and constant K defined by $K = (U_o - U_n)/(\delta \cdot U_o \cdot U_n)$.

TABLE 2

| Parameter | Relationship between near point Un and reference focal position Uo | | | | |
|---|---|---|---|---|---|
| | Area a | Area b | Area c | Area d | Area e |
| $U_n$ (m) | 1.0 | 1.3 | 1.5 | 2.0 | 2.5 |
| $U_o$ (m) | 2.00 | 2.59 | 2.99 | 3.98 | 4.97 |
| K ($10^{-3}$/mm$^2$) | 7.14 | 5.47 | 4.75 | 3.55 | 2.84 |

The limit values of the focal length the f and F number are selected based upon the characteristics of the respective parameters as described above. The values are selected to make the best use of the merits of the panfocus type lens, (Condition 3)—The shorter the focal length f the better, and (Condition 4)—The larger the F number the better, as described above.

On the other hand, to make the use of the zooming lens system, it is desired that "the focal length f is variable in a wide range from a short focal point to a long focal point". To make photography possible when low quantity of light is available, such as indoor or cloudy weather, it is a natural condition that "the smaller F number the better".

The relationship between the focal length f and the F number, when the area c and area e in Table 2 are selected as follows, is given in Table 3 below.

$U_n = 1.5$ m, 2.5 m $U_o = 2.99$ m, 4.97 m $\delta = 0.07$ mm

TABLE 3

| Relationship between focal length f and F number | | |
|---|---|---|
| Focal length f (mm) | F number ($U_n = 1.5$ m) | F number ($U_n = 2.5$ m) |
| 70 | 23.0 | 13.7 |
| 60 | 17.1 | 10.1 |
| 55 | 14.3 | 8.5 |
| 50 | 11.8 | 7.0 |
| 45 | 9.6 | 5.7 |

TABLE 3-continued

| Relationship between focal length f and F number | | |
|---|---|---|
| Focal length f (mm) | F number ($U_n = 1.5$ m) | F number ($U_n = 2.5$ m) |
| 40 | 7.6 | 4.5 |
| 35 | 5.8 | 3.4 |
| 30 | 4.3 | 2.5 |

If the panfocus lens condition is set to be generous such as $\delta = 0.07$ mm$\phi$, and $U_n = 2.5$ m, as described above, the focal length can be widely varied between 30–70 mm. At this time, the following formula (6) is obtained $$F = K \cdot f^2 \qquad (6)$$

from the fundamental formula obtained by modifying the formula (1):

$$F = f^2 \cdot (U_o - U_n)/(\delta \cdot U_o \cdot U_n)$$

In order that the near point $U_n$ of the depth of field approaches 2.5 m and the area of the panfocus is widely taken, it is understood that the relationship of $K \geq 2.8 \times 10^{-3}$/mm$^2$ may be established from Table 2. The panfocus type zoom lens which has a preference for the zooming function and is practical can be constituted by the zoom lens system disposed so as to fulfill the relationship of $F \geq 2.8 \times 10^{-3}$/mm$^2 \cdot f^2$. In this case, the zooming function can be widened to the range of $f = 30-70$ mm.

Next, the panfocus type zoom lens having the zooming function which has a preference for the panfocus function and is practical will be described hereinafter.

To place the panfocus function in preference, the diaphragm value may be increased in accordance with the (Condition 4) "The larger the F number the better". At this time, in order to secure the quantity of light necessary for exposure, the shutter speed T is decreased. However, the shutter speed T cannot be made too slow, so in order not to produce a hand vibration phenomenon. The lower limit of the shutter speed is $T = 1/30$ sec.

The actual range of the F number is also controlled according to the brightness (EV value) of an object and film sensitivity (ISO value).

When the F number and the shutter speed T are determined, the limit EV (exposure value) is given by $$EV = \log (F^2/T)/\log 2 \qquad (7)$$

For the F number corresponding to $U_n = 1.5$ m shown in Table 3, the limit EV value in each focal length f is obtained in accordance with the formula (7) as given in Table 4.

TABLE 4

| Relationship between limit quantity of light and focal length | | |
|---|---|---|
| Focal length (mm) | Limit EV ($\delta = 0.05$) | Limit EV ($\delta = 0.07$) |
| 60 | 14.1 | 13.1 |
| 55 | 13.6 | 12.6 |
| 50 | 13.0 | 12.0 |
| 45 | 12.4 | 11.4 |
| 40 | 11.7 | 10.7 |
| 35 | 10.9 | 10.0 |
| 30 | 10.1 | 9.1 |

On the other hand, the brightness of the object is as follows:

| (1) Under lamplight in general home | 4 to 6 EV |
|---|---|
| (2) In department stores | 7 EV |
| (3) Bright indoor | 8 to 10 EV |
| (4) Shade in cloudy weather | 11 to 13 EV |
| (5) Outdoor in the daytime | 13 EV |
| (6) Bright scene | 14 EV |
| (7) Seashore in summer | 14 to 17 EV |
| (8) Snow scene in fine weather | 17 EV |

These numeric values are values in cases where ISO100 films are used. However, normal films have a latitude (allowance) of the order of 2 EV, and that portion can be discounted from the limit EV value shown in Table 4. As a result, by setting the diameter of allowable circle of confusion $\delta$ to 0.05 mm $\phi$ and the variable range of the focal length to 30-50 mm, there can be constituted a panfocus type zoom lens which is not so wide in zooming range but has a sufficiently wide depth of field (1.5 m $-\infty$) and which can perform photographing from indoor of EV13 (substantially 11) or more to outdoor photography.

Similarly, if the allowable circle of confusion $\delta$ is 0.07 mm $\phi$, the zooming area can be enlarged to the variable range of focal length = 30 to 60 mm.

Moreover, if the strobe photography function is added, there can be constituted a camera free from a limit with respect to the brightness of an object.

In the above-described example, if the ISO400 film is used, the F number can be drawn by two stages as an increased portion of sensitivity and therefore the zooming area can be further widened.

In the present structure, a description has been given where the shutter speed is at a low speed limit because the object side of low luminance is covered. However, when high luminance occurs, the shutter speed is designed so as to be variable in some stages whereby an appropriate exposure condition may be obtained.

Next, features of a zoom optical system of a so-called mechanical compensation type 2-group form will be described.

The zoom optical system of the 2-group form is composed of a front lens group displaceable on a photographic optical axis (merely referred to as an optical axis) and a rear lens group. The relative displacement of the rear lens group to the front lens group controls the focal length and the magnification of the entire system, and the displacement of both lens groups to a fixed barrel mainly controls the focus position.

However, in a camera which uses the zoom lens set to the panfocus, when the magnification is varied, the depth of field slightly varies accordingly. It is therefore necessary to take the influence on the appropriate range of photographing into consideration.

In photographic lenses, the range of focal depth of the lens is determined from the diameter of the minimum circle of confusion of the lens. When the focussing state of the object is within the range of focal depth, it is regarded as a practical sharp focussing state (an appropriate focussing state). However, since there is a limit in the range of depth of focal point, the range of depth of field corresponding to the range of focal depth also produces a limit for itself. It is thus difficult for lenses designed in a conventional procedure to photograph the whole area from a near distance to an infinitely far distance in the sharp focussing state.

In the above-described formulas (1) and (2), $$U_n = f^2 U_o / (f^2 + F \cdot \delta \cdot U_o) \quad (1)$$

$$U_f = f^2 U_o / (f^2 - F \cdot \delta \cdot U_o) \quad (2)$$

which defines the depth of field, it is understood that the near limit $U_n$ and far limit $U_f$ of the depth of field are also varied depending upon the variation of the focal length f and F number. This means that "the optimum reference focal position according to the focal length is present (within the range of freedom of design to some extent).

For example,
(1) In case of f=50 mm, F=13.5 and $\delta$=0.05, if $U_o$ is 3.6 m, 1.8 m to infinite far ($U_n$=1.8 m, $U_f$=$\infty$) can be covered.
(2) In case of f=35 mm, F=9.9 and $\delta$=0.05, if $U_o$ is 2.7 m, 1.4 m to infinite far ($U_n$=1.4 m and $U_f$=$\infty$) are covered.

In the above-described formulas (1) and (2), since the diameter of allowable circle of confusion $\delta$ is the amount that cannot be controlled in principle, the desired depth of field cannot be obtained unless the F number or reference focal position is varied.

If means capable of individually controlling a change in focal position resulting from the change in magnification as described above is present, the shape of a cam groove which defines the relative displacement amount of each lens group constitutes a relatively simple relation. On the other hand, the zoom lens of the present embodiment uses a zoom optical system of a panfocus type, and therefore has an arrangement which uses a cam shape formed by adding an amount of displacement necessary for focussing to the optimum reference focal position at the focal length to an amount of displacement of the lenses of the front and rear groups when a variable power action takes place, so that the whole area from the near distance to the infinitely far distance may be photographed by the panfocus.

Figure 4:
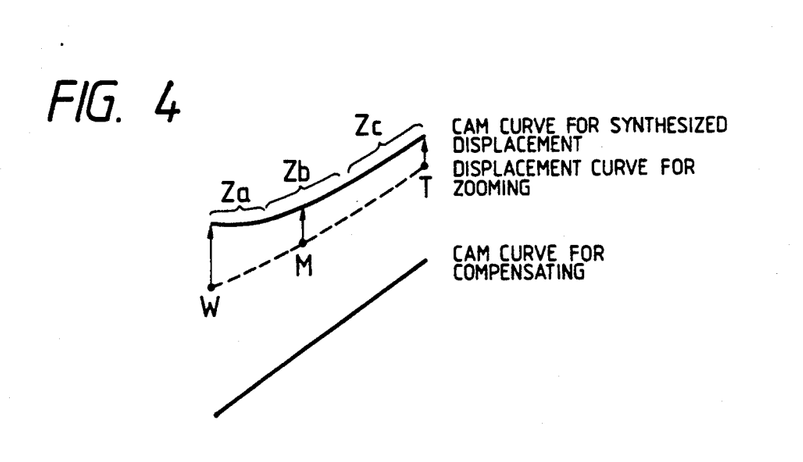
FIG. 4 illustrates a cam curve for the front group and a cam curve for the rear group used in the zoom lens shown in FIG. 1.

That is, in this zoom lens, as shown in FIG. 4, a predetermined zoom area (a variable area of focal length) is divided, for example, into three small areas, i.e., Za (wide position), Zb (medium position) and Zc (teleposition). In the respective small areas Za, Zb and Zc, an amount of displacement necessary for the optimum focussing at the respective points within the respective small areas is obtained. This obtained amount of displacement is mainly distributed to the front lens group, thereby determining a synthesized cam curve of the front group and rear group, on the basis of which cam group shape of a rotary cam tube is set.

DETAILED DESCRIPTION OF THE PREFERRED EMBODIMENTS

Figure 1:
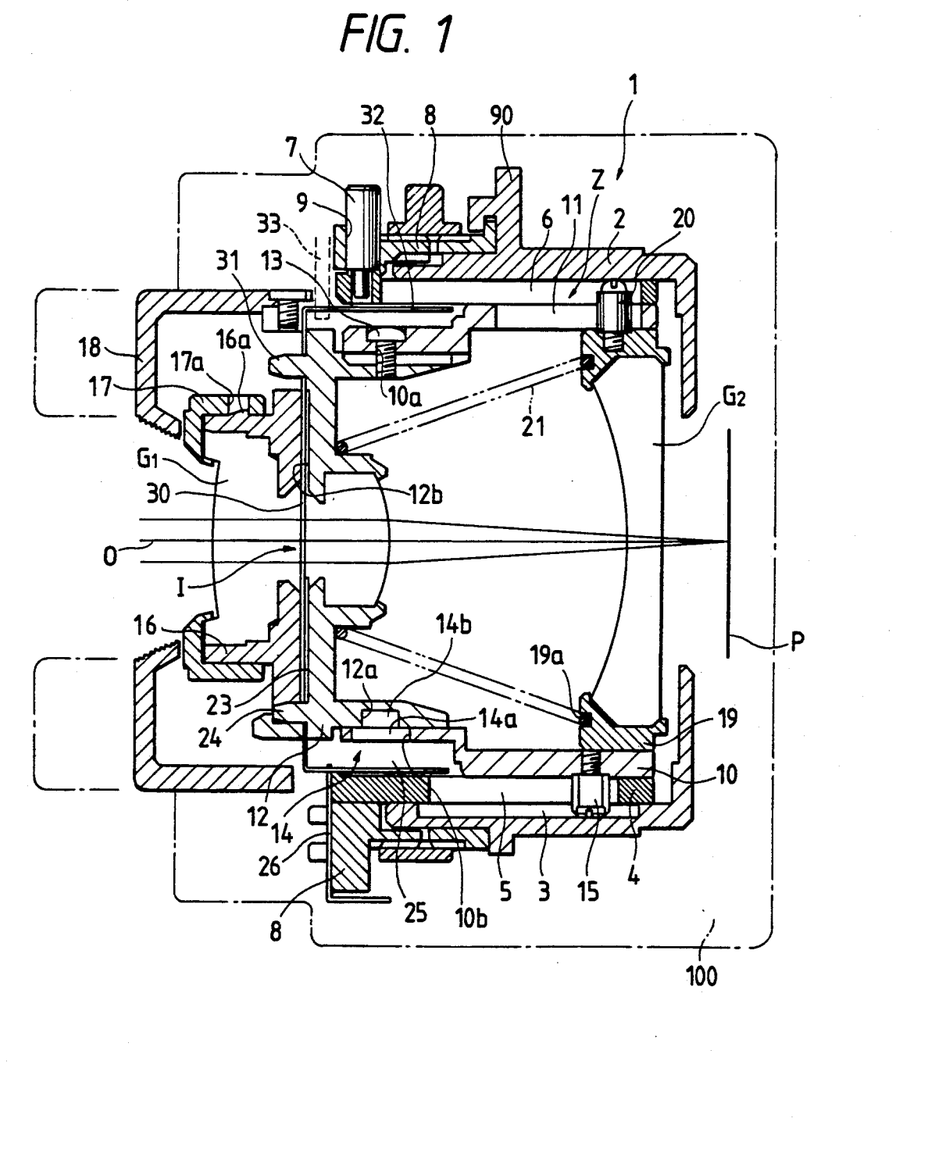
FIG. 1 is a cross-sectional view showing one embodiment of a zoom lens according to the present invention.
Figure 2A:
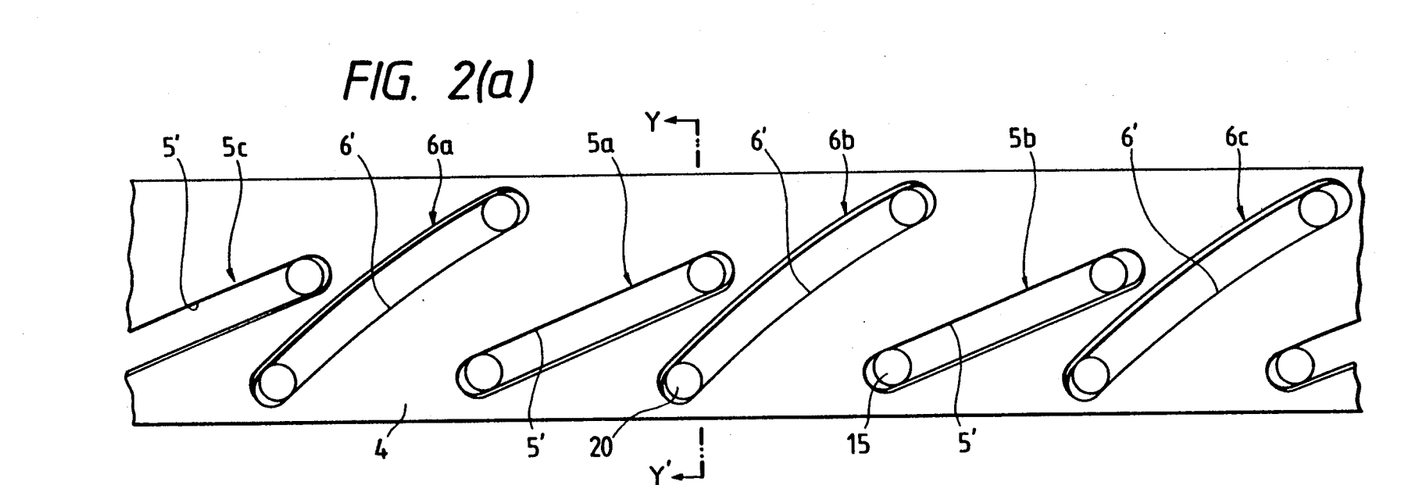
FIG. 2(a) is an enlarged view of a cam groove for a front group and a rear group formed in a circumferential wall of a rotary cam tube of the zoom lens shown in FIG. 1.
Figure 2B:
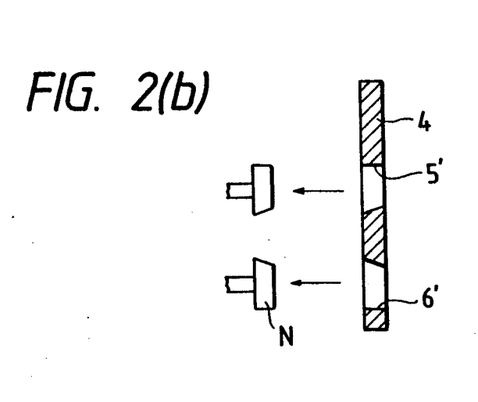
FIG. 2(b) illustrates formation of the cam groove.
Figure 3:
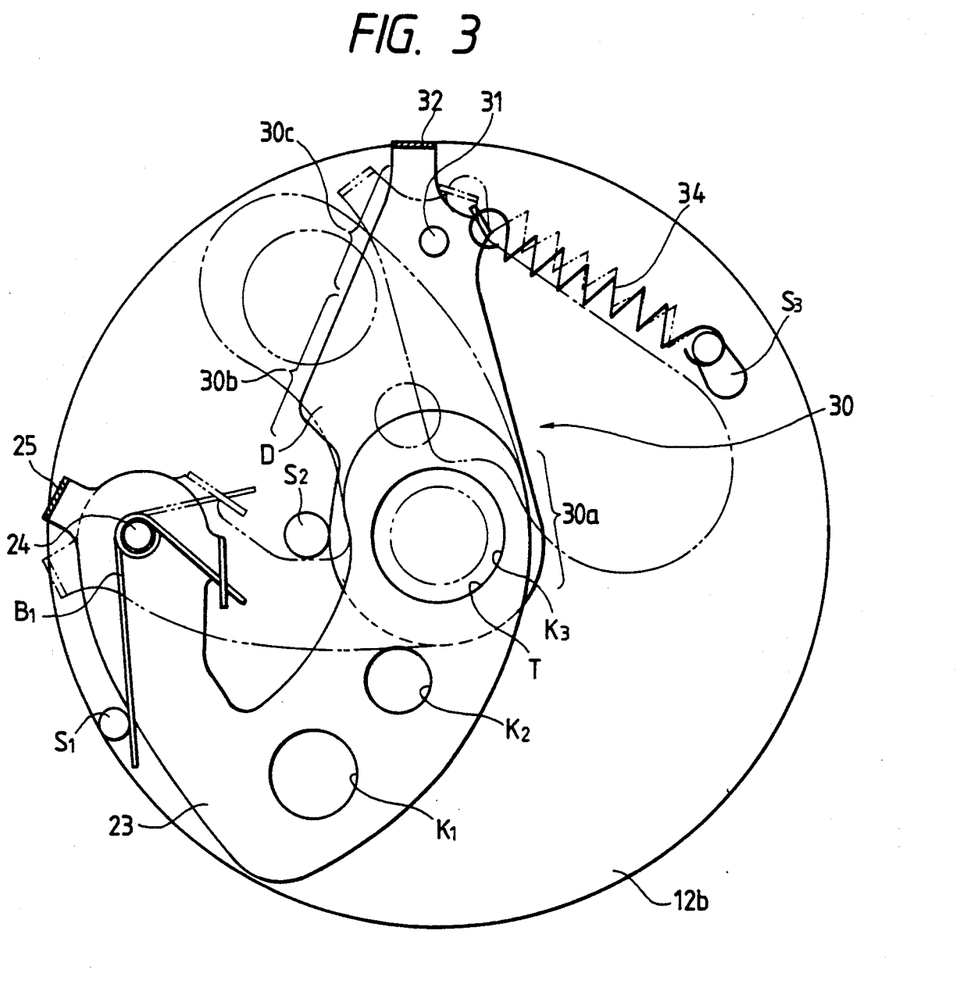
FIG. 3 is a plan view showing the structure of a diaphragm blade and a shutter blade.
Figure 5:
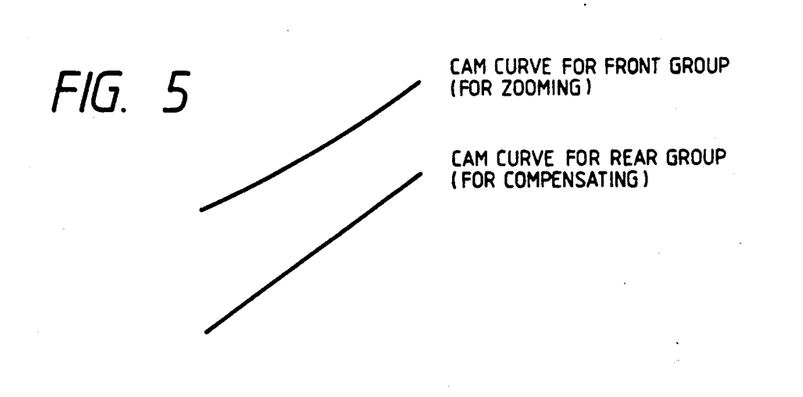
FIG. 5 illustrates a cam curve for the front group and a cam curve for the rear group used in a conventional zoom lens.
Figure 6A:
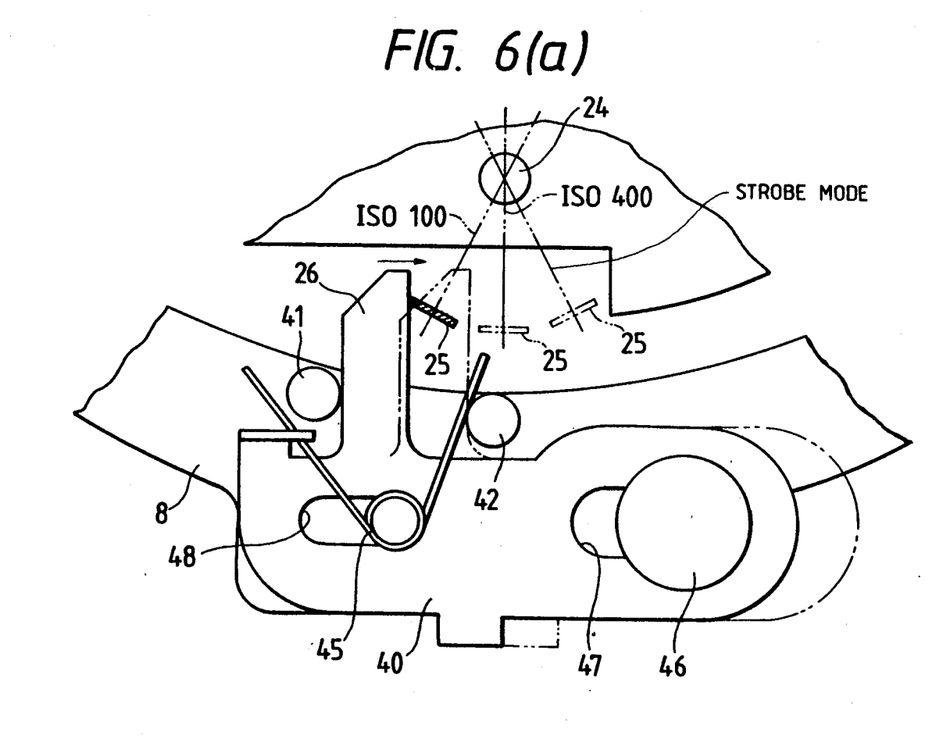
FIGS. 6a and 6b illustrate a beating portion for the diaphragm blade.
Figure 6B:
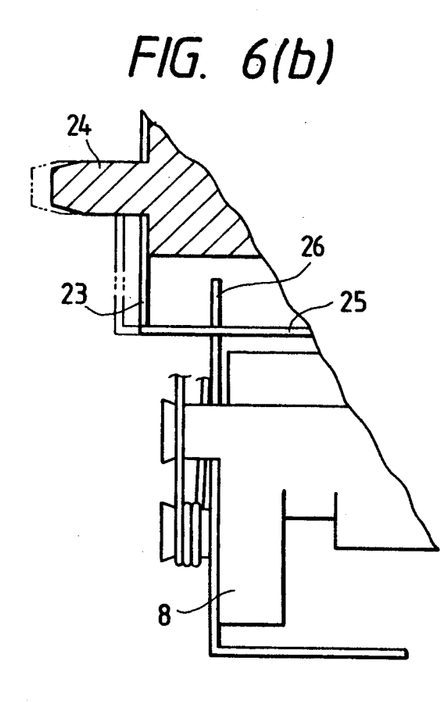
Figure 7:
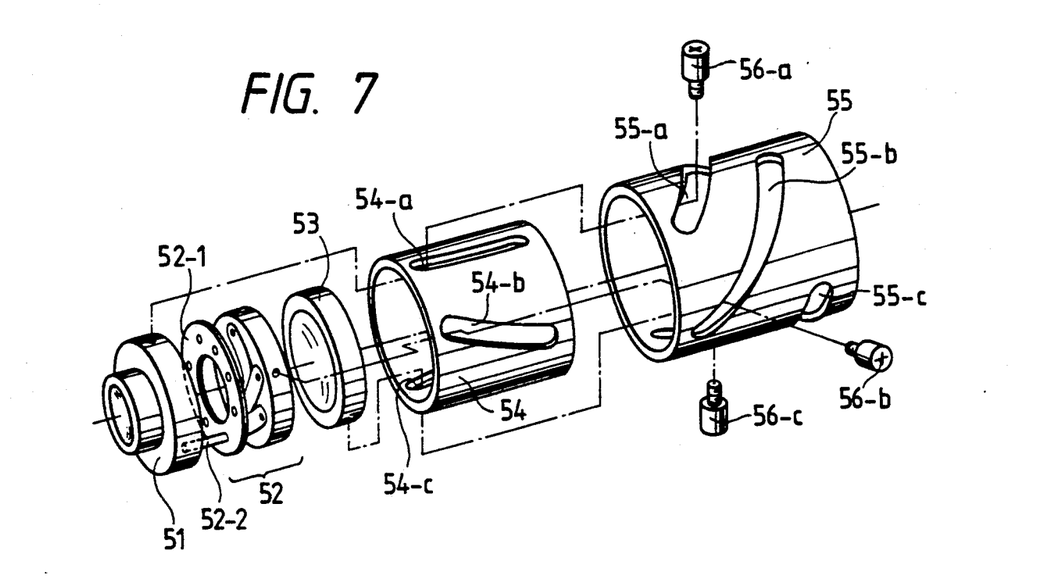
FIG. 7 is a perspective view of another embodiment of the present invention.
Figure 8:
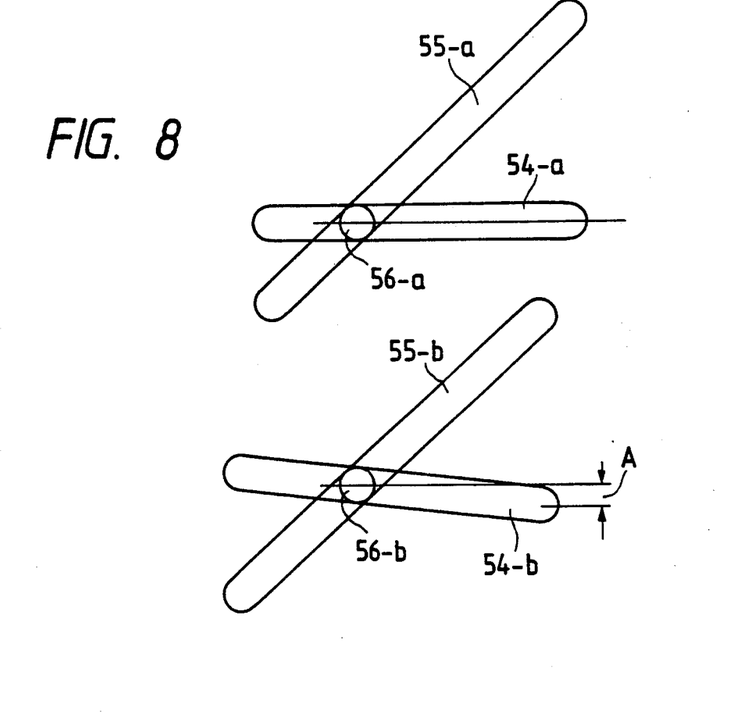
FIG. 8 is a developed arrangement of a cam groove.

This invention will be described in detail in connection with the embodiments shown in the accompanying drawings, in which FIG. 1 is a sectional view showing one example of a zoom lens according to the present invention; FIG. 2(a) is a developed view of a cam groove for a front group and a rear group formed in a circumferential wall of a rotary cam tube of the zoom lens shown in FIG. 1, and FIG. 2(b) illustrates formation of the cam groove; FIG. 3 is a plan view showing the structure of a diaphragm blade and a shutter blade; FIG. 4 illustrates a cam curve for the front group and a cam curve for the rear group used in the zoom lens shown in FIG. 1; FIG. 5 illustrates a cam curve for the front group and a cam curve for the rear group used in a conventional zoom lens; FIGS. 6a and 6b illustrate a beating portion for the diaphragm blade; FIG. 7 is a developed view of another embodiment; and FIG. 8 is a developed arrangement of a cam groove.

In the drawings, reference numeral 1 designates a zoom lens according to the present invention, which is in the form of a zoom lens comprising two groups including a front lens group $G_1$ and a rear lens group $G_2$.

The front lens group $G_1$ and the rear lens group $G_2$ are relatively displaced along an optical axis 0 by a zooming machine system Z to effect a predetermined variable power action. An added portion of displacement of the front lens group $G_1$ mainly takes place from the adjustment of the reference focal position according to the rate of variable power (FIGS. 2 and 4).

The zooming machine system Z is provided with main constituent elements of a rotary cam tube 4, a cam groove 5 for the front lens group, a cam groove 6 for the rear lens group, a direct advance barrel 10, guide pins 15 and 20, which will be described later and are collectively provided on the focussing surface with respect to a diaphragm principal surface I. The zooming machine system Z is connected to a first direct advance guide groove 3, a first lens frame 12 for the front lens group, a second lens frame 19 for the rear lens group and a spring 21, which are described later and are members in engagement with the former elements.

Reference numeral 2 designates a fixed barrel of the zoom lens 1, the fixed barrel having a projected portion in the vicinity of the center in FIG. 1 mounted on a body 100 of a compact camera, for example.

Reference numeral 3 designates a first direct advance guide groove formed in a part of the inner peripheral surface of the fixed barrel 2, the guide groove 3 being formed parallel to the optical axis 0, which linearly guides the first and second lens frames 12 and 19 along the optical axis 0 together with the direct advance barrel 10 which will be described later.

Reference numeral 4 designates a rotary cam tube rotatably fitted in the inner peripheral surface of the fixed barrel 2. The rotary cam barrel 4 is formed in its peripheral wall with a cam groove 5 for the front lens group and a cam groove 6 for the rear lens group 6. The cam grooves 5 and 6 are composed of three unit cam groups 5a to 5c and 6a to 6b, respectively, arranged so that their respective divided angles with the optical axis 0 as an origin may assume the respective uniformly divided angles.

In this embodiment, since the rotary cam tube 4 is fabricated as an injection molded article formed of a hard synthetic resin material having a light-shield property, at least one end of the respective unit cam grooves 5a to 5c and 6a to 6c is applied with a draft at the time of molding. This is the draft for removing a core mounted on a portion corresponding to each unit cam groove of a mold used for molding the rotary cam tube 4, in a direction substantially perpendicularly intersecting a plane including the optical axis 0 during the molding operation.

When, for example, a core N is removed in a direction passing through the optical axis on line Y—Y' of FIG. 2(a), a draft is not formed in sides 5' and 6' of the cam grooves 5a and 6a as shown in FIG. 2(b). Instead, a vertical surface is formed. That is, this draft is applied merely to the groove side positioned on the side of the camera body 100 for the respective unit cam grooves 5a to 5c of the cam groove for the front group 5 and to the groove side positioned on the side of an object for the respective unit cam grooves 6a to 6c of the cam groove for the rear group 6.

Accordingly, the cam action surfaces (guide wall) of the cam groove for the front group 5 and the cam groove for the rear group 6 are set at the groove sides 5' and groove sides 6' comprising vertical surfaces are confronted outside for the respective paired three unit cam grooves 5a and 6a, 5b and 6b and 5c and 6c.

The cam shape of the cam groove for the front group 5 is formed at the groove side 5' of the respective unit cam grooves 5a to 5c as the synthesized displaced curve of a displaced curve of the front lens group $G_1$, based on the variable power rate of the zooming system and a displaced curve of the front lens group $G_1$ necessary for focussing to the optimum reference focal position corresponding to the variable power rate. On the other hand, the cam shape of the cam groove for the rear group 6 is formed at the groove side 6' of the respective unit cam grooves 6a to 6c as a displaced curve of the lens for the rear group $G_2$ necessary for setting the magnification.

The rotary cam tube 4 is also designed so that a displacement on the optical axis 0 is prevented by a zooming operating rod 7 mounted on the outer peripheral surface thereof and a circular hole 9 formed in the diaphragm operating member 8.

The diaphragm operating member 8 is rotatably fitted in the outer peripheral surface on the object side of the fixed barrel 2 and is not displaced in the direction of the optical axis. The diaphragm operating member 8 being formed with the circular hole 9 having a predetermined radial open angle in the forward portion thereof. The zooming operating rod 7 is mounted on the rotary cam tube 4 so that it may extend through the circular hole 9 and project outwardly from the diaphragm operating member 8. The radial open angle of the circular hole 9 is set so as to be able to secure a circular operating angle of the zooming operating rod 7 necessary for realizing a predetermined area of variable power.

The fitting state between the zooming operating rod 7 and the circular hole 9 is such that at the time of zooming operation, the zooming operating rod 7 may effect its circular motion precisely and smoothly within the circular hole 9.

Reference numeral 10 designates a direct advance barrel fitted in the inner peripheral surface of the rotary cam tube 4 for direct advance movement. A second direct advance guide groove 11 is formed in a part of the peripheral wall positioned on the side of the camera body of the direct advance barrel 10. This linearly guides a lens frame 19 the rear group along the optical axis 0. The direct advance barrel 10 positioned on the side of an object is provided in the peripheral wall portion thereof with a slot 10a in a direction of an optical axis through which a small screw 13 extends and a circular hole 10b in which is fitted a large circular portion 14a of an eccentricity adjusting member 14 which will be described later.

The second lens frame 12 for the front group is provided to house a lens group positioned rearwardly among the front lens group $G_1$, and is formed of a light-shielding synthetic resin material, for example. In this case, the lens group set interiorly of the second lens frame 12 for the front group is fixedly held by fastening the rear edge portion of the lens frame 12.

A part of the peripheral wall positioned on the side of the camera body 100 of the second lens frame 12 is formed with a circumferential slot 12a for receiving a small circular portion 14b of the eccentricity adjusting member 14.

The second lens frame 12 and the direct advance barrel 10 are integrally coupled through the small screw 13 which passes through the slot 10a in a direction of an optical axis.

The eccentricity adjusting member 14 comprises a large circular portion 14a eccentrically coupled and a small circular portion 14b. The large circular portion 14a being fitted into the circular hole 10b of the direct advance barrel 10, and the small circular portion 14b being fitted into the circumferential slot 12a of the second lens frame 12. Preferably, the eccentricity adjusting member 14 is mounted at a position opposed to the small screw 13 with the optical axis 0 being sandwiched therebetween. An amount of eccentricity S of the eccentricity adjusting member 14 is set to S=2 mm, for example. This amount of eccentricity S is provided to precisely adjust and set the on-the-axis space between the second lens frame 12 and the lens frame 19.

Preferably, the width of the slot 10a in a direction of an optical axis of the direct advance tube 10 is set to the minimum dimension capable of permitting the small screw 13 to pass therethrough, and the width of the circumferential slot 12a of the second lens frame is set to substantially the same size as the diameter of the small circular portion 14b of the eccentricity adjusting member 14. However, the second lens frame 12 is biased by a spring in a direction of the object as will be described later, and therefore, the dimension of the width of the slot 12a may have a slight play with respect to the diameter of the small circular portion 14b.

Reference numeral 15 designates a guide pin (or a roller) mounted on three places of the peripheral wall of the direct advance barrel 10. Pin 15 extends through the respective unit cam grooves 5a to 5c of the cam groove 5 of the rotary cam tube 4 and thereafter engages the first direct advance guide groove 3 of the fixed barrel 2. Accordingly, when the cam action of the cam groove 5 is applied to the direct advance barrel 10 through the guide pin 15 by rotating the rotary cam barrel 4, the direct advance barrel 10 moves straight on the optical axis 0 while being guided by the first direct advance guide groove 3.

Reference 16 designates a first lens frame for the front group formed, for example, of a light-shielding synthetic resin material. The lens frame 16 holds a lens positioned frontwardly in the front group lens. Lens frame 16 is mounted on the front surface of the second lens frame 12 by means of a suitable coupling means, and an engaging projection 16a is formed on a part of the outer peripheral surface thereof.

Reference numeral 17 designates a lens keep frame formed of a light-shielding synthetic resin material. An engaging hole 17a formed in the peripheral wall thereof is engaged with the projection 16a of the first lens frame. Lens keep frame 17 is mounted on the first lens frame 16 while keeping the aforesaid lens.

Reference numeral 18 designates a fancy ring provided frontwardly of the zoom lens 1. The fancy ring 18 may be mounted on the front portion of the first lens frame 16, the second lens frame 12, the front portion of the front cover portion of the diaphragm operating member 8 or the camera body. In the case where the fancy ring 18 is mounted on the diaphragm operating member 8 or the like, it is necessary to set, between the fancy ring 18 and the lens keep frame 17, a gap in consideration of the amount of displacement of the rotary cam tube 4 which displaces along the optical axis 0 when zooming and focussing.

Reference numeral 19 designates a lens frame for holding the rear lens group $G_2$. The lens frame 19 is formed, for example, of a light-shielding synthetic resin. A lens group internally set can be fixedly held by caulking the rear edge portion of the lens frame 19. The lens frame 19 is slidably fitted into the inner peripheral surface of the direct advance barrel 10, and guide pins (or rollers) 20 are mounted on three places of the peripheral wall thereof.

The guide pin 20 passes through the second direct advance guide groove 11 of the direct advance barrel 10 and then fits into the respective unit cam grooves 6a to 6c of the cam groove 6 of the rotary cam tube 4. When the cam action of the cam groove 6 is applied to the lens frame 19 through the guide pin 20 by rotation of the rotary cam tube 4, the lens frame 19 is guided by the second direct advance guide groove 11 of the direct advance barrel 10 and moves straight on the optical axis 0.

In the zoom lens 1 shown, a cam displacement device related to the lens frame 19 is composed of a rotary cam groove mechanism comprising the guide pin 20, the cam groove 6 of the rotary cam tube 4, and a direct advance cam groove mechanism comprising the guide pin 20 and the second direct advance guide groove 11 of the direct advance barrel 10. A cam displacement device related to the lens frame 12 is composed of a rotary cam groove mechanism comprising the guide pin 15 of the direct advance barrel 10 and the cam groove 5 of the rotary cam tube 4, and a direct advance cam groove mechanism comprising the guide pin 15 and the first direct advance guide groove 3 of the fixed barrel 2.

Reference numeral 21 designates a compression spring which is interposed between the lens frame 19 and the second lens frame 12. The compression spring can be formed as a coil spring in the shape of cone, for example. The spring 21 has one end fitted into an engaging groove 19a formed in the front surface of the lens frame 19, and the other end placed in pressure contact with the rear surface of the second lens frame 12. The spring 21 causes the guide pin 15 of the direct advance barrel 10 to be placed in pressure contact with the cam surface 5' of the respective unit cam grooves 5a to 5c of the cam groove 5 and at the same time causes the guide pin 20 of the lens frame 19 to be placed in pressure contact with the cam surface 6' of the respective unit cam grooves 6a to 6c of the cam groove 6.

Accordingly, the compression spring 21 is not limited to a coil-like spring, and the bias force is set to a value within the range capable of achieving the object thereof. Material for the compression spring 21 is not limited to a metal wire, but a plastic wire rich in elasticity may be used.

In FIG. 3, reference numeral 23 designates a diaphragm blade (a pivotal member). The blade 23 is pivotably supported by means of a shaft 24 and includes a plurality of openings $K_1$, $K_2$ and $K_3$ of different diameters disposed in order on a predetermined radial locus (in the drawing, from the lower end close to the supporting surface). The diaphragm blade 23 is provided with a suitable open-wind spring $B_1$, by which the blade is biased so that the latter may be always rotated in a fixed direction. The diaphragm blade 23 is rotated across the optical axis 0 by a driving means (not shown) on the side of the body 100 whereby one of the openings $K_1$, $K_2$ and $K_3$ is positioned on the optical axis 0 and superposed on a light-transmitting hole T so as to set the diaphragm value as intended. On the blade 23, the standard opening $K_1$ at the lower end corresponds to the film sensitivity=ISO100, the small opening $K_2$ at the central portion to the film sensitivity=ISO400, and the large opening $K_3$ at the upper end to the strobe photographing mode, respectively.

Reference numeral 25 designates an interlocking arm (a portion to be beaten) for rotating the diaphragam blade 23. The end of the arm 25 is projected from the outer perpheral surface of the second lens frame 12, bent parallel to the optical axis 0 and extended toward the fixed barrel 2. Even if the lens frame 12 is delivered, it can be engaged with the beating portion on the side of the body 100 within the range of the delivery.

Reference numeral 26 designates an ISO switching member (beating portion) mounted on the front end of the diaphragm operating member. The switching member 26 is always placed in pressure contact with the interlocking arm 25 of the diaphragm blade 23 against the spring $B_1$. The member 26 is moved in response to the film sensitivity whereby the diaphragm blade 23 set to the standard opening $K_1$ at the lower end (corresponding to the ISO100) is rotated through a predetermined angle and can be set to the small opening $K_2$ at the central portion (corresponding to the ISO400). If the diaphragm blade 23 is further rotated by a strobe setting member (not shown) separately from the ISO switching member 26, it can be set to the large opening $K_3$ at the upper end. In this case, since the interlocking arm 25 is extended toward the fixed barrel 2, even if the second lens frame 12 is displaced on the optical axis 0 by the zooming operation, the engaging state with respect to the switching member 26 or the interlocking arm 25 of the strobe setting member is maintained within the range of delivery (FIGS. 6(a) and 6(b)).

Reference numeral 30 designates a shutter blade (a rotating member), which is supported pivotally, perpendicularly intersecting the optical axis 0 by a shaft 31 on the plate 12b, similar to the diaphragm blade 23. The blade 30 is formed of a sheet metal whose whole shape is in the form of a ladle. Front area 30a is approximately a disk surface, central area 30b is a wide surface continuous so as approximately the same width as the disk surface and provided with a convex portion D at the side edge thereof, and rear area 30c is a strip-like surface narrower than the wide surface. The front area 30a can cover the whole light transmitting hole T, the convex portion D of the central area 30b can prevent a deviation from the diaphragm from the diaphragm blade 23, and the rear area 30c can support the blade 30.

The shaft 31 causes the displacement of the interlocking arm 32 of the rear area 30c of the blade 30 to be amplified 3 to 5 times at the front area 30a. At the rear end of the rear area 30c, the interlocking arm 32 is extended toward the fixed barrel 2 and engaged with a beating portion 33 of a known shutter release means (not shown) provided on the fixed barrel 2, so as to drive the blade 30.

Reference numeral 34 designates a spring. The spring 34 has one end provided in the vicinity of the outer periphery of the plate 1 and the other end provided on the side edge opposite the convex portion D of the rear area 30c so that when the blade 30 is set to be opened, the spring is extended, and at the moment the beating portion 33 passes through the interlocking arm 32, and the blade 30 is urged to be rotated in the opposite direction to set it to a closed state. Reference character $S_3$ designates a stopper which when the shutter blade 30 is opened, comes into contact with the outer side edge of the front area 30a to define its open limit position, and $S_2$ denotes a stopper which when the blade 30 is closed, comes into contact with the inner side edge of the front area 30a to define its closed limit position, these stoppers being erected suitably on the plate 12b.

Interlocking arms 25 and 32 cause the outer peripheral side ends of the diaphragm blade 23 and the shutter blade 30 to be bent toward the fixed barrel 2 to thereby provide an integral structure. It should to be noted of course that a separate plate-like member or a rod-like member may be fixedly mounted on the aforesaid end. Moreover, the switching member 26 of the fixed barrel 2 and the beating portion 33 may be extended toward the blades 23 and 30 so as to engage the diaphragm blade 23 and the shutter blade 30, or suitable members may be extended from both the diaphragm blade 23 and the shutter blade 30 and the switching member 26 and the beating portion 33 so that they are engaged with each other.

It is to be noted that the shutter blade 30 may be suitably mounted at the rear of the lens frame 19 instead of being mounted in the gap between the second lens frame 12 and the second lens frame 16 similarly to the diaphragm blade 23. The known shutter release means may also be mounted at a suitable position. Reference numeral 40 designates an ISO switching beating member, 41, 42 stoppers, 45 an open-wind spring, 46 a support member, and 47, 48 slots (FIG. 6b).

The operation and function of the zoom lens 1 constructed as described above will be described hereinafter.

First, the diaphragm operating member 8 is rotated to set the diaphragm to a predetermined value. That is, when the diaphragm operating member 8 is rotated, the rotation operating amount is transmitted to the diaphragm blade 23 through the diaphragm switching member 26 and the interlocking arm 25 to select the openings $K_1$ to $K_3$ having the intended size, so as to set the diaphragm to the light transmitting hole T on the photographic optical axis 0.

Next, the zooming operating rod 7 is rotated to determine the focal length of an object. That is, as the zooming operating rod 7 is rotated, the rotary cam tube 4 rotates and the cam groove 5 is engaged with the guide pin 15 to displace the direct advance barrel 10, and the cam groove 6 is engaged with the guide pin 20 to displace the lens frame 19.

At that time, the direct advance barrel 10 is linearly displaced along the optical axis 0 by the guide action of the first direct advance guide groove 3 and the guide pin 15, and the lens frame 19 is linearly displaced along the optical axis 0 by the guide action of the second direct advance guide groove 11 and the guide pin 20. However, since the compression spring 21 is disposed between the second lens frame 12 and the lens frame 19, the guide pin 15 is pressed against the cam surface 5' of the cam groove 5, and the guide pin 20 is pressed against the cam surface 6' of the cam groove 6 whereby the respective engaging state is maintained accurately.

Therefore, the relative position between the first and second lens frames 16 and 12, substantially integral with the direct advance barrel 10 and the lens frame 19 is precisely varied. The on-the-axis gap between the front lens group $G_1$ and the rear lens group $G_2$ is varied to a value as desired, and the focal length according to the rotation operating amount of the zooming operating rod 7 is realized accurately. In this case, an amount of displacement for focussing to the optimum reference focal position according to the variable power rate is applied to the cam groove for the front group 5, and therefore, focussing is simultaneously carried out so as to have a suitable depth of field simultaneously with the realization of the focal length.

When the shutter button is depressed to release the beating portion 33 provided on the shutter release means for high speed travel, the interlocking arm 32 is beaten by the beating portion 33 and the blade 30 is rotated about the shaft 31. At this time, the light transmitting hole T having been shielded by the front area 30a of the blade 30 is set from the closed state to the open state so that light in the quantity corresponding to either of the openings $K_1$ to $K_3$ moves into the film surface. Next, when the beating portion 33 passes through the interlocking arm 32, the blade 30 is urged in the opposite direction by the spring 34 and stops at the stopper $S_2$, and the light transmitting hole $T_1$ is again reset to the closed state. Even in a case where the lens frame 12 is delivered toward the body by the zooming operation or the like, the interlocking arm 32 and the beating portion 33 can be engaged within the range of the delivery.

In the above-described embodiment, the diaphram aperture is maintained constant even during the zooming. For the brightness of lens, the F number satisfied with the formula at the long focal length end where f is maximum is unavoidably selected. However, as will be apparent from the conditional formula for the panfocus, $$F = K \cdot f^2 \qquad (6)$$

in case where the focal length is short, it is possible to employ a smaller F number. In narrow places such as indoors, the short focal length is often utilized, and in addition, these places are often dark. Therefore, it is advantageous to utilize a smaller F number.

In formula (6), the F number is a square of the focal length. In case of positive and negative two-group zoom, the focal length f and the F number are approximately in a proportional relationship. Therefore, normally, the F number on the short focal length side is sacrificed.

In the embodiment shown in FIG. 7, the diaphragm is opened as zooming takes place to thereby realize a smaller F number on the short focal length side while maintaining the condition of panfocus.

In FIG. 7, secured to a lens frame 51 of the first lens group is a cam pin 56-a in engagement with a cam groove 54-a of a fixed barrel 54 and a cam groove 55-a of a cam ring 55. Secured to a diaphragm shutter portion 52, having a diaphragm which is opened and closed by rotation of a control ring in a conventional manner to vary the diaphragm value, and a lens frame 53 are cam pins 56-b and 56-c, respectively, which are engaged with cam grooves 54-b, 54-c and 55-b, 55-c, respectively. The cam ring 55 is inserted into the fixed barrel 54 so that the former cannot be moved in a direction along an optical axis but can be freely rotated.

FIG. 8 is a developed view showing the cam grooves 54-a, 54-b of the fixed barrel 54, the cam grooves 55-a, 55-b of the cam ring 55 and the cam pins 56-a, 56-b. When the cam ring 55 is rotated, the cam pins 56-a and 56-b are moved in a direction along an optical axis by the cam grooves 55-a and 55-b, respectively, since the barrel 54 is fixed.

At this time, the cam pin 56-a engages the cam groove 54-a parallel with the optical axis and therefore is not rotated but moved laterally, while the cam pin 56-b is moved laterally and rotated since the cam groove 54-b is inclined with respect to the optical axis. Accordingly, the diaphragm shutter portion 52 is rotated by rotation of the cam ring 55 resulting from the zooming operation.

On the other hand, among the diaphragm shutter portion 52, a diaphragm keep plate 52-1 is restrained from rotation since a rotation defining pin 52-2 is inserted into the first lens group frame. Therefore, the open diaphragm diameter is varied by a angle difference between a rotating portion and a non-rotation portion of the diaphgram shutter portion.

Thereby, when the focal length of the lens is varied from the short focal length to the long focal length, the F number can be maintained accordingly at the minimum F value fulfilling the formula (6), that is, $$F \approx 2.8 \times 10^{-3} \times f^2$$

It is to be noted of course that if the focussing position is varied and F number is also varied, the most advantageous photographic condition can be realized.

Accordingly, photography can be effected with a magnification as intended merely by releasing a shutter without being affected by the focussing conditions.

While in the foregoing, the present invention has been described in connection with the embodiments, it is to be noted that the present invention is not limited thereto but various modifications may be made within the scope, not changing the subject matter thereof. For example, two group zoom lens have been described in the illustrated embodiments, but the present invention can be sufficiently applied to a zoom lens of a 3-group type used in a high class camera.

As described above, the present invention is characterized in that the focal position of the zoom lens system is set to the panfocus, and the focal length f and the F number of the lens system are satisfied by the relationship given below $$F \geq 2.8 \times 10^{-3} \times f^2$$

Therefore, the zoom lens of the present invention has both the merit of the panfocus type which eliminates the need of the focussing operation and the merit of the zooming type which can continuously and variably select the photographic magnification as desired. As the result, the present invention has the excellent effect capable of realizing a compact camera of which high class function can be enjoyed even by the beginners and middle class persons in a simple operation. Moreover, the structure with the merit of the panfocus type placed to preference as well as the structure with the merit of the zooming type placed to preference are possible, thus greatly contributing to the individuality of a compact camera.

What is claimed is:

1. A camera including a plurality of lenses together having an optical axis, a focal length f, a focal position, a far point and a depth of field, the camera comprising:
    means for guiding said lenses in the direction of the optical axis to vary the focal length and to vary the focal position so that the far point of the depth of field is always an infinite far while the focal length is being varied; and drive means for moving at least one of said lens in accordance with the guiding means.

2. A camera according to claim 1, wherein said guiding means includes means for selecting an F number as a function of focal length f so that the following formula is fulfilled over the whole focal area:

$F \geq 2.8 \times 10^{-3} \times f^2$.

3. A camera according to claim 1, wherein said drive means imparts an amount of movement to which said guiding means adds an amount of movement for displacement of the focal position to one of the lenses for varying the focal length.

4. A camera according to claim 3, wherein the guiding means comprises a single cam groove.

5. A camera including a plurality of spaced-apart lenses together having an optical axis, a focal length f, a far point and a depth of field, the camera comprising:
 means for guiding said lenses in the direction of the optical axis to vary the space between the lenses to thereby vary the focal length;
 a drive means for moving at least one of said lenses in accordance with said guiding means;
 a diaphragm for setting an F number; and
 means for controlling said diaphragm such that the F number is set so that the far point of the depth of field is always an infinite far while guiding means is varying the focal length.

6. A camera according to claim 5, wherein diaphragm controlling means sets the F number in accordance with the following formula:

$F \geq 2.8 \times 10^{-3} \times f^2$.

7. A camera including a plurality of spaced-apart lenses together having an optical axis, a focal length, a focal position, a far point and a depth of field, the camera comprising:
 means for guiding said lenses in the direction of the optical axis to vary the space between the lenses to thereby vary the focal length and to vary the focal position;
 drive means for moving at least one of said lenses in accordance with said guiding means;
 a diaphragm for setting an F number; and
 means for controlling said diaphragm to set the F number so that the far point of the depth of field is always an infinite far while the focal length is being varied.

8. A camera including a plurality of lenses, the camera comprising:
 at least one cam surface shaped to guide said lenses to have a varying focal length f;
 means for moving at least one of said lenses in accordance with said guiding means; and
 means for setting an F number which fulfills the folowing relationship $F \geq 2.8 \times 10^{-3} \times f^2$.

* * * * *